US005497418A

United States Patent [19]

Kudelski

[11] Patent Number: 5,497,418
[45] Date of Patent: Mar. 5, 1996

[54] DATA PROCESSING SYSTEM HAVING A SET OF MEMORY CARDS

[75] Inventor: André Kudelski, Crissier, Switzerland

[73] Assignee: Nagra Plus S.A., Cheseaux, Switzerland

[21] Appl. No.: 244,768

[22] PCT Filed: Oct. 8, 1993

[86] PCT No.: PCT/EP93/02773

§ 371 Date: Jun. 9, 1994

§ 102(e) Date: Jun. 9, 1994

[87] PCT Pub. No.: WO94/09453

PCT Pub. Date: Apr. 28, 1994

[30] Foreign Application Priority Data

Oct. 9, 1992 [FR] France .................................. 92 12322

[51] Int. Cl.$^6$ .................................................. H04N 7/167
[52] U.S. Cl. ..................... 380/5; 380/16; 380/20
[58] Field of Search ........................... 380/5, 16, 20

[56] References Cited

U.S. PATENT DOCUMENTS 5,144,663  9/1992  Kudelski et al. .......................... 380/16
5,319,453  6/1994  Copriviza et al. .......................... 348/6

FOREIGN PATENT DOCUMENTS

0361491  9/1989  European Pat. Off. .

Primary Examiner—David C. Cain
Attorney, Agent, or Firm—Clifford W. Browning; Woodward, Emhardt, Naughton, Moriarty & McNett

[57] ABSTRACT

A data processing system comprises a set of memory cards (10) and at least one central administration and processing unit (22). According to the invention, the memory cards and the processing unit together form a relational database. Each memory card contains a memory (28) for storing a set of instructions (A1, A2, ..., An), each instruction containing a logical link with at least one other instruction. The system is applicable notably to pay-TV and other restricted access systems, for example in banking.

15 Claims, 4 Drawing Sheets

DATA PROCESSING SYSTEM HAVING A SET OF MEMORY CARDS

TECHNICAL FIELD

The present invention relates generally to a system for processing the storage of data and carrying out specific programmes by means of memory cards.

BACKGROUND ART

There are many known data processing systems comprising a set of "memory cards", at least one "administration and processing station" or "unit" and at least one "communications network" for communicating at least one "memory card" with at least one station.

In this description, "memory card" will be used to designate all types of card, also known as chip card, smart card or IC-card, including an electronic circuit and/or a passive element for storing digital data and possibly further enabling logical operations to be performed. All these cards will henceforth be referred to as "memory card" or simply "card".

These known systems include memory cards which are usually cards each having at least one integrated circuit (so-called IC memory cards) forming a microprocessor comprising ROM, RAM, EPROM and/or EEPROM type memories, access to these memories being controlled by a programme stored in the integrated circuit. These known systems also include at least one administration and processing unit or station, which is external to the memory cards, and which has the capability to write and/or read in at least one zone (hereinafter called the "private" zone, or "limited access" zone) of some or all of the memory cards.

Such a station will hereinafter be called a "central administration and processing station or unit" when it has the right to modify limited-access zones on the memory cards, and a "secondary station" when it is not authorized to modify limited-access zones.

Ever since memory cards were devised, a number of applications of this technology have appeared.

A first known generation of memory cards employed a central station able to write secret information into the card, and a number of secondary stations from which it was possible to consult non-critical data stored in the card, i.e. data which did not include the possibility of revealing or eliminating secret information.

A second known generation of memory cards used principally for pay-TV systems (CPTV cards) had, for each card, a variable number of secondary stations each able to freely and exclusively deal with its own limited-access zone of the card. In pay-TV systems, the secondary stations are for example television programme emitting stations. Each secondary station is generally constituted by a specific service vendor or by a television programme emitting station.

To make the system safe, this memory card structure prevents (or renders hermetic) any communication between the different limited-access zones of the different principal administration units. Hence, any given television programme broadcasting station in principle does not have a right to access any limited-access zone of a card which is reserved for another television programme broadcasting station. For each new service vendor or each new television programme broadcasting station, it is necessary to open a new limited-access zone on the card.

To illustrate this, consider the following voluntarily-simplified situation.

Supposing a pay-TV subscriber X wishes to subscribe to three television channels A, B and C, he has to contact each of the three channels who, via the transmitted video signal, will register orders to open respective limited-access zones in the subscriber's card. In subscriber X's card, 4 limited-access zones will be opened, namely an "emitter zone" and three limited-access zones for the three channels A, B and C respectively. The limited-access zones will be opened by the central administration station which is the only station with the right to open new limited-access zones, in other words it is the only station having the overall right to manage the card's entire contents. This principle is used at present in the Eurocrypt pay-TV norm.

These known second-generation cards have the following drawbacks.

Because of the setting up of several pay-TV systems and several data distribution systems, the following limitations occur:

A. The known systems are based on classic data-processing systems, namely segmenting of a part of the memory into several zones each reserved for a specific user, the central station (service vendor) conventionally having identical access to each of the cards, like in the case of a computer which is connected up by entering its password.

B. The processing/administration models used are based on the possibilities which were available before the electronic messenger service era. The model has not been revised to take into account new possibilities offered by the existence of a flux of data between a video signal emitting station and each memory card (CPTV-card) inserted in a pay-TV subscriber's decoder.

C. The data distribution structures have turned out to be much more complex than the originally-envisaged simple models, hence complicating administration while considerably limiting its flexibility.

D. The fact that for pay-TV there is principally a one-way flux between the operator and the memory card means that one can never be certain if the message has been well received, which creates difficult-to-simulate operating difficulties.

Such limitations set out above under headings A, B, C and D will be further explained in the subsequent description with reference to FIGS. 4 to 7.

SUMMARY OF THE INVENTION

An object of the invention is to propose a new data processing system comprising a set of memory cards and at least one administration and processing unit, in which the processing of data in the cards is facilitated.

Another object of the invention consists of proposing such a system in which a modification in the number of administration and processing units is easier to handle.

Another object of the invention consists of proposing such a system in which a modification in the type of administration and processing units is easier to handle.

Another object of the invention consists of proposing such a system in which a modification in the hierarchy of certain operations (rights or obligations) linked to several central stations is easier to handle.

Generally, according to the invention, the memory cards and the central administration and processing unit together form a relational database.

According to one of its aspects, the invention concerns a system for processing the storage of data and for carrying out specific programmes, the system comprising: at least one data administration and processing unit, a plurality of memory cards, and at least one data communication means for communicating data between at least one administration and processing unit and each memory card, in order to transmit a given number of instructions to be stored or to be used in a memory card when this card is connected to a processing unit.

Each memory card comprises a writeable memory for storing at least some of said instructions, and a memory for storing at least one said specific programme. According to the invention, each memory card connected at any instant to at least one processing unit via a communication means constitutes a relational database, all of the cards which are simultaneously connected also forming a relational database.

In order to constitute a relational database in this way, each instruction is made up of either at least one digital data, or a logical linking data which enables a logical link to be established between at least two other instructions or at least between the present instruction and at least one other instruction, or a combination of such a logical linking data with at least one digital data. Moreover, each memory card includes means for controlling the performance of at least one specific programme stored in the memory card, using for this purpose at least one logic set constituted by all of the instructions connected together by logical links, selected from amongst said instructions stored in the writeable memory of the memory card.

Each instruction or part of an instruction related to a logical link may be an instruction or a part of an instruction which either is already stored in the memory card, or is to be stored later in, the memory card.

Each instruction may be stored in the writeable memory of the memory card, associating with it one or more identification codes which enable said thus-constituted different logic set or sets to be identified later.

In an embodiment of the system, the data communication means allows transfer of data only in one direction, from a processing unit to any memory card connected thereto. For example, this system is a restricted-access type system such as a pay-TV system in which each memory card is a card possessed by a subscriber to the system, which card is connectable to a decoder of the system to allow the performance of a restricted-access function. This processing unit is either a memory card administration service or is a station for broadcasting a scrambled video signal, and the data communication means communicates data by Herzian electromagnetic transmission, by satellite or by cable. Such communication may be a real communication or a virtual communication.

Advantageously, the processing unit comprises periodicity-setting means which repeatedly sends a group of instructions with a given periodicity via the data communication means, in such a manner that all of the memory cards which are connected simultaneously to at least one processing unit at any given instant receive, in a time interval determined by the periodicity, the group of instructions. All of the memory cards which are thus simultaneously connected at this instant hence operationally constitute a relational database.

The invention also concerns a set of memory cards wherein each memory card of the set comprises a writeable memory for storing instructions, and a memory for storing at least one specific programme, and all of the memory cards of the set which are simultaneously connected at any instant to at least one processing unit via a communication means constitute at this instant a relational database.

The invention also concerns the memory card itself of the type including pay-TV cards, banking cards and other cards for restricted-access and like systems, comprising a writeable memory storing a set of data and at least one programme for performing specific operations on the stored data. According to the invention, the set of data stored in this card is constituted by storing, at any locations whatsoever selectable by the memory, successive data received by connecting the card, by real or virtual connection via a data communication means, to one or more data administration and processing units of one or more restricted-access systems or the like. The set of data comprises logical links connecting stored data or enabling the setting up of links between the stored data, whatever may be the data storage location or its order of inputting, and possibly also links with other data, thus constituting within the card a relational database. The card also comprises a specific programme arranged to go through and inspect the entire set of data of the relational database constituted within the card so as to carry out at least one specific operation with data interconnected by at least one logical link.

Hence, in this card, the relational database is constituted, on the one hand, of data pre-stored in the memory and, on the other hand, of data received from one or more data administration and processing units, the logic links of the relational database being contained either in pre-stored data, or in received data, or both, so that the or each programme can only perform a specific operation when the relational database has been constituted within the card by said connection.

The memory card according to the invention is hence distinguished from known cards in that it becomes the central element of the system, because the relational database is constituted within the card itself, enabling improved data administration and processing leading to numerous advantages that will be explained later.

The invention also concerns a method of processing and carrying out specific programmes in a system as set out above.

In one application, for example for pay-TV, data is transmitted between at least one processing unit and the memory cards with a one-way flux, from at least one processing unit to the memory cards.

For other applications, notably in banking, there are at least two different processing units, and the data is transmitted between the processing units and the memory cards with a two-way flux. Some data is, during a first connection of a memory card with a first processing unit, transmitted from the first processing unit to the memory card and then, during another simultaneous or later connection of a memory card with another processing unit, transmitted from this memory card to this other processing unit.

As a result, certain specific information is hence transmitted from the first central station to the other central station, even in situations where the administration and processing station cannot exchange certain specific information for example for reasons of security. A particular application in banking is that the cardholder is able to carry out, within the card itself, operations on accounts administered by different administrative units.

Conventional systems enable one operator to have the full, partial or shared use of restricted-access zones according to defined parameters which authorize him to carry out reading, writing and/or calculation operations as a function of given orders pertaining to certain information contained in a predetermined zone.

The system according to the invention provides for carrying out reading, writing and/or calculation operations as a function of finding links, which signifies that the operator does not have access to a defined zone, but to data satisfying a link requested by the operator.

The conditions for access are accepted as a function of data linked, by definition, to the access conditions, which may for example be formed of a password or an encrypted algorithm.

Alongside its ability to modulate access rights or rights to use information, this new system enables optimization of use of the memory resource and is able to accommodate for memory locations that can no longer be utilized.

Access to the information is governed by specific programmes written in a relational database type language. These programmes may be pre-defined in the memory card in compiled form, or can be remote loaded in compiled form or remote loaded with interpretable macro-instructions. The interpretable programme concept enables the rights of an operator to be limited.

Banking applications involving several service vendors may employ the concept of an inter-operator link set up by an exchange of cryptograms. In this case, whoever requests a link will send an identification cryptogram provided with an identification of the transaction ("token"). The receiver will verify the validity of the message and, in case of acceptance, memorize the token. This concept enables inter-zone relationships within a memory card to be defined precisely.

The new concept may be used as follows:

A. The operator's administration system and the set of all of the memory cards form a relational database. Each operation performed between the operator's administration system and a part of the memory cards can be expressed as a command in a relational database control language.

B. Any given memory card can be part of several relational databases formed between the operator's administration system and several memory cards, i.e. it can form part of several entities.

C. Externally-originating controls and requests for information trigger the operation of a programme written in a relational database control language, providing precise definitions of rights to access information and processing operations. The programmes can be stored in compiled form or in a to-be-interpreted form.

D. With this structure it is possible to provide a system wherein no individual constituent element contains all of the data. For the overall system to be able to operate, it is necessary to have both the administration and processing systems and the associated memory cards, which latter constitute an interface between the different components of the system.

E. The memory card's internal structure is organised as a relational database. It enables the rights or other stored data to be administered and processed in a "dynamic" manner.

F. The structure of each card's database inter-relates the data with itself and with programmes and, for security of transmission, with encrypted keys. The notion of an encrypted key is thus considered as a link between data, the encrypting method and the encrypted key.

G. The database structure enables data to be transmitted in compact form between the administration and processing unit and the memory card, by sending data to modify the database, instead of directly sending the database itself to create/store a copy thereof. The link structure enables verification that all data has been received before the data is put to use.

H. The installation of this new system exploits present-day memory card technology, namely use of a writeable memory of relatively small size. The setting up of links and their verification takes place by a complete review/examination of the memory. The memory simply stores all of the data one after another, with incorporated data links. However, with this system a memory zone can never be directly read; reading is only possible, providing there is authorized access, by interposed link.

I. Discrimination between data subject to different authorizations is made by a link with an encrypting algorithm and an encrypted key or a password, not by an authentication procedure controlled access to the data in a selected zone.

J. The memory structure does not have predefined storage zones for each function, i.e. for data, programmes, encrypting keys and validity dates. Instead, it has a continuous data storage space wherein use of the data is governed by links (conditions) between data. This structure can be conceptualised by considering that the memory is filled with data which may be a date, a key, a credit, a programme and/or any data in general, and a link defining the conditions of use.

K. The described system has a system for "cleaning" unused zones. Cleaning is made possible by a "limiting validity date" link which enables automatic elimination of obsolete data or links. It is of course also possible to free specified zones at will by giving commands.

L. The notion of a "purse" is defined as a system where the setting up of a link involves payment. However, debits of a credited amount can only take place by the establishment of "authorised" links.

M. New functions or routines may be remote-loaded by procedures that can be applied to linked data. By this method, it will be possible to limit the use of these new functions or routines to selected operations.

N. Controls for setting up a link may be carried out either by direct addressing to a given memory card, or by considering that the card belongs to a group where each card is addressed by a hierarchical code (so-called "bit-map"). The notion of address may also be considered as a link.

O. The memory cards may also receive controls which require a specific function, for example, an encryptage. In this case, the function to be applied can be defined as a link towards such a function.

P. The set of commands that can be performed by a memory card may be encrypted.

Q. Inter-zone data exchanges may take place with encryption and with tokens in order to provide an inter-zone security, principally for banking applications.

The advantages of the new concept according to the invention are as follows.

In contrast to second-generation memory cards systems, the system described herein enables data accessing rights to be modulated more precisely than when each operator has a defined access right. The proposed system enables definition of access rights for each defined type of data.

This system allows a memory card to perform a central role in the information administration and processing system, by being at its "heart", instead of being considered as a juxtaposition of copies of data already existing in a administration and processing system.

In conventional systems, the data is set up in complete form by an operator before being transferred to the memory card. This means that it is necessary to compile the entire set of information belonging to one operator before transmission thereof to the memory card, even though it is not necessary to perform this operation at the same location for all of the operators of one and the same card.

The proposed system allows data to be established inside each memory card, which enables optimum exploitation of the notion of a "shared secret" because it is not necessary to build up an image of the card contents and then transmit this.

This concept means that, for a given operator, the data is distributed between his administration and processing system and the set of cards, because there is no access to certain links other than via the memory cards.

In practice, the defined data structure enables data to be composed inside the card instead of transmitting pre-prepared data to the memory card.

In other words, a new system is proposed, comprising memory cards wherein the data is not stored in pre-defined areas as a function of its use, but wherein data is stored as a function of the available space in the memory, or space made available therein, and the data's role is determined by the associated conditions of use.

BRIEF DESCRIPTION OF DRAWINGS

These and other objects, features and advantages will be well understood from the following description of an embodiment given solely by way of example, illustrated by the accompanying drawings wherein.

PREFERRED EMBODIMENTS

Figure 1:
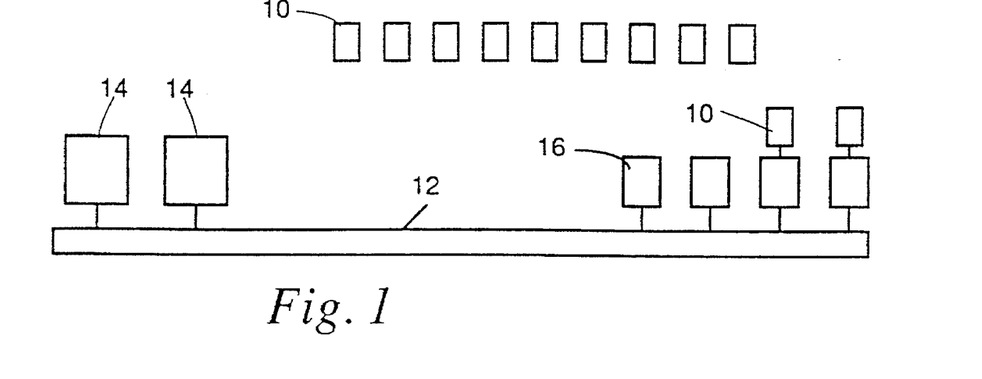
FIG. 1 illustrates a system according to the present invention.

A system according to the invention is schematically shown in FIG. 1. This system is formed of a certain number of memory cards 10, a communications network 12, at least one administration and processing unit 14 (two units are shown) connected to network 12, and at least one terminal station 16 (four are shown) connected to network 12. At any moment, a card can be connected to units 14 by being connected to a terminal station 16, also called connecting device. This connection can be real or virtual.

This configuration may for example correspond to a banking card system. However, in the case of pay-TV, the units 14 are TV emitting stations or agencies offering various commercial services pertaining to pay-TV (subscription administration services, etc . . . ), the network 12 is not a physical line but is constituted by propagation of the video signal by herzian electromagnetic waves, by satellite or by a cable network, and the connecting devices 16 are subscriber's decoders, each subscriber having a decoder 16 and a card 10 connectable to the decoder in order to be able to receive a decoded or unscrambled TV emission.

The system according to the invention may thus apply to two principal types of activity, a banking network type of activity and a pay-TV type of activity. The difference between these two activity types resides principally in the fact that in a banking network data can be transferred in two directions between the operator and the card, whereas in pay-TV data is transferred essentially in one direction from the operator (emission) to the card (reception).

Figure 2:
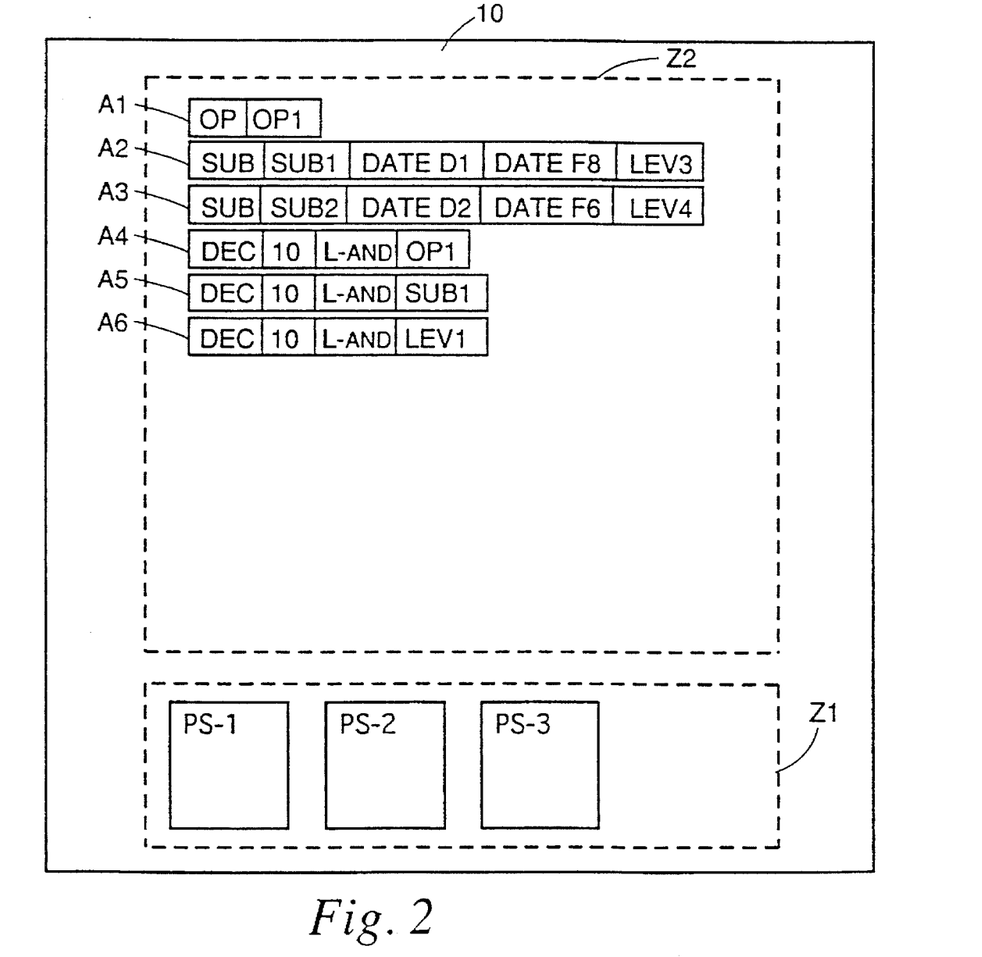
FIG. 2 is a diagram illustrating the mode of storage of data in a memory card of the system according to the present invention.

On FIG. 2 can be seen a number of boxes which schematically represent data stored in a "writeable memory", for example an EEPROM, of a memory card 10 belonging to a system according to the invention applied for example to pay-TV. "Writeable memory" will hereinafter be used to describe any memory which offers the possibility of storing new data, with or without the possibility of selectively deleting certain previously-stored data. Thus, an EEPROM corresponds to this definition of writeable memory, but a RAM which is for example powered by a back-up battery also falls under this definition.

When a card 10 is connected to an operator's processing unit 14, the card receives a certain number of data from the operator.

The card 10 contains a memory zone Z1 which contains a certain number of specific programmes PS-1, PS-2, PS-3 each of which corresponds to a particular mode of use of the card. For example, for pay-TV, the card may serve:

to decode a received emission (programme PS-1), to purchase the right to view future emissions (programme PS-2), to record a modification of credit for receiving missions (programme PS-3), to record modifications of rights to access future emissions, for example as a function of modifications in the organisation of the emitting stations or in the distribution of TV emissions (for instance mergers or splitting apart of TV channels), etc.

The card also contains a memory zone Z2 whose function will be explained later.

Take for example the use of card 10 to decode a received emission. The operator sends a specific instruction DEC which is received by the card and activates programme PS-1 corresponding to function DEC, decoding the received emission. The operator then sends a certain number of instructions A1, A2, A3, . . . . An which will be stored in the card's zone Z2, one after the other, in the order of arrival. The order of storing or the location of storing in zone Z2 is without importance. One of the originalities of the system according to the invention resides in the fact that the instructions A1, A2, A3, . . . . An include logical links between the data (hereinafter referred to simply as "links").

For example, the following instructions, as shown in FIG. 2, have the following meanings:

| | Instruction A1 |
|---|---|
| OP | This instruction is a designation of an authorized operator |
| OP1 | This authorized operator is operator N°1 |
| | Instruction A2 |
| SUB | This instruction concerns an acquired subscription right |
| SUB1 | Concerns subscription N° 1 |
| DATE D1 | Starting date D1 of this subscription |
| DATE F8 | Finishing date F8 of this subscription |

| | -continued |
|---|---|
| LEV 3 | Level 3 of subscriber's receiving right (for example level 1 may correspond to sports, level 2 to sports + films, level 3 to sports + films + varieties, level 4 to all programmes, etc . . . ) |

Instruction A3

| SUB | This instruction concerns an acquired subscription right |
|---|---|
| SUB2 | Concerns another subscription N° 2 |
| DATE D2 | Starting date D2 of this subscription |
| DATE F6 | Finishing date F6 of this subscription |
| LEV 4 | Level 4 of subscriber's receiving right |

There may also be other types of instruction, as follows, with their significations:

Instruction A4

| DEC | This instruction concerns decoding |
|---|---|
| 10 | Link 10 (i.e. all instructions with the same link N° are logically interconnected) |
| L-AND links | Logic AND link (usually there are logic such as the conventional AND, OR, NOR operations etc.) |
| OP1 | The operator sending this instruction is operator N°1 |

Instruction A5

| DEC | This instruction concerns decoding |
|---|---|
| 10 | Link 10 |
| L-AND | Logical AND link |
| SUB1 | The operator sending this instruction offers a subscription N°1 |

Instruction A6

| DEC | This instruction concerns decoding |
|---|---|
| 10 | Link 10 |
| L-AND | Logical AND link |
| LEV 2 | The operator sending this instruction offers a level 2 emission |

Instructions A1 to A3 are rights which have previously been allocated to the card 10. In other words, at a given time, an authorized operator is designated by operator N°1 (instruction A1), then rights for subscription N°1 were recorded in the card (instruction A2) by an authorized operator, and at a later time the same operator or another authorized operator has recorded in the card rights for subscription N°2 (instruction A3).

Instructions A4 to A6 are instructions sent to the card at the same time as the operator transmits a scrambled emission, these instructions allowing authorization for the decoder to which this card is connected to unscramble (or decode) only if conditions regarding acquisition of rights by the card are satisfactory.

When instructions A4 to A6 are received, the card 10 recognizes that these instructions concern a decoding function (DEC code) and consequently the card activates its specific programme PS-1 which authorizes decoding only if the necessary rights have been acquired. This specific programme PS-1 consequently operates in the following manner:

(1) examine all instructions which are interconnected by a specific link, i.e. all instructions which have the same link N° (in this example, the three instructions A2, A4 and A5 are considered as being linked), (2) examine the types of the logical links (in this example, the three instructions A2, A4 and A5 are all linked by the logical AND function), (3) check if A4 is verified (in this example, check if the operator who sends instruction A4 is authorized—the answer is YES because instruction A2 is verified, i.e. the emitted subscription SUB1 is the same as the acquired subscription SUB1), (4) if YES, verify if A5 is verified (in this example verify if the card has rights for the emitted subscription—the answer is YES because instruction A2 is verified, i.e. the emitted subscription SUB1 is equal to the acquired subscription SUB1), (5) if YES, verify if A6 is verified (in this example verify if the card has rights for the emitted level of programme—the answer is YES because instruction A2 is verified, i.e. the level of the emitted programme (level 2) for subscription 1 is less than or equal to the level acquired for the card (level 3) for this same subscription), (6) if YES, verify if the current date lies between the starting and the finishing dates for the emitted subscription (in this example, the answer is YES if the current date is between D1 and F8, which are the starting and finishing dates for subscription SUB1), (7) the specific programme PS-1 then permits decoding by decoder 16 if it has obtained:

a YES answer for instruction A4

AND a YES answer for instruction A5

AND a YES answer for instruction A6

AND a YES answer for step (7) which is a specific step of programme PS-1, i.e. a specific control concerning programme PS-1 in order to verify the necessary conditions for authorizing decoding.

In other words, the specific programme verifies the existence of logical links between the incoming instructions. In this example, the specific programme PS-1 verifies the instructions for proposed decoding, i.e. instructions A4, A5 and A6, starting from acquired rights recorded in the card, namely rights defined by previously stored instructions A1, A2 and A3. The programme may also carry out complementary verifications which are specific to the function implemented by the programme : in this example, programme PS-1 carries out the specific verification of step (7).

It can be seen that the different input instructions A1, A2 etc. can be stored one after the other in the memory zone Z2 of memory card 10, the order with which they are stored being without importance. If a stored instruction is deleted, the following stored instructions can be shifted to occupy the freed memory space, in the case where the instructions do not all have the same length. If the formatting is such that all instructions have the same length, the instructions which follow a stored instruction that has been deleted are not shifted, because a new instruction can be stored in the freed memory space.

When a specific programme is carried out, the operation which consists in verifying all of the links between the different stored instructions is carried out by successively going through and examining all the stored instructions. It is for this reason that the order of storing the different instructions is without importance.

Figure 3:
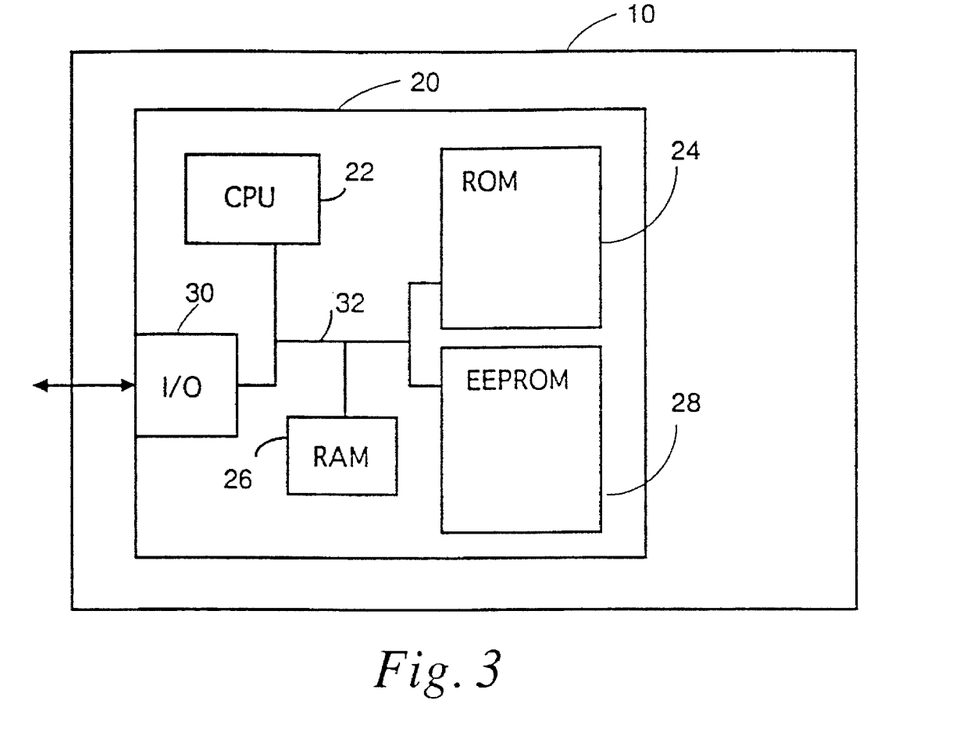
FIG. 3 is a block diagram of the structure of a memory card of a system according to the invention.

FIG. 3 shows the structure of a memory card of a system according to the present invention. This memory card 10 may include a single integrated circuit 20 comprising principally a central processing unit (CPU) 22, a ROM 24, a RAM 26 and an EEPROM 28, an input/output (I/O) circuit 30 and a data communication device 32 connecting these elements.

ROM 24 contains permanent data for controlling the inputs/outputs, a basic start-up programme for card 10 and one or several programmes/routines defining controls and general instructions for the database. ROM 24 in particular includes a means for controlling the EEPROM 28 so that, at the moment when the card 10 is connected to a processing unit 22, EEPROM 28 carries out the following operations:
control of the EEPROM 28 so it stores each input data, delivered by the processing unit 22, in any memory spaces whatsoever, selected by the EEPROM 28; and
preliminary search when an instruction is received to determine whether or not this instruction is already stored in the EEPROM 28, and storage of this instruction at any location whatsoever of the EEPROM 28 only if this instruction is not already stored.

The EEPROM 28 can store the entire set of instructions of the database and possibly also other database commands that can be effaced at will, as well as the previously-mentioned specific programmes PS-1, PS-2, PS-3, etc.

Figure 4:
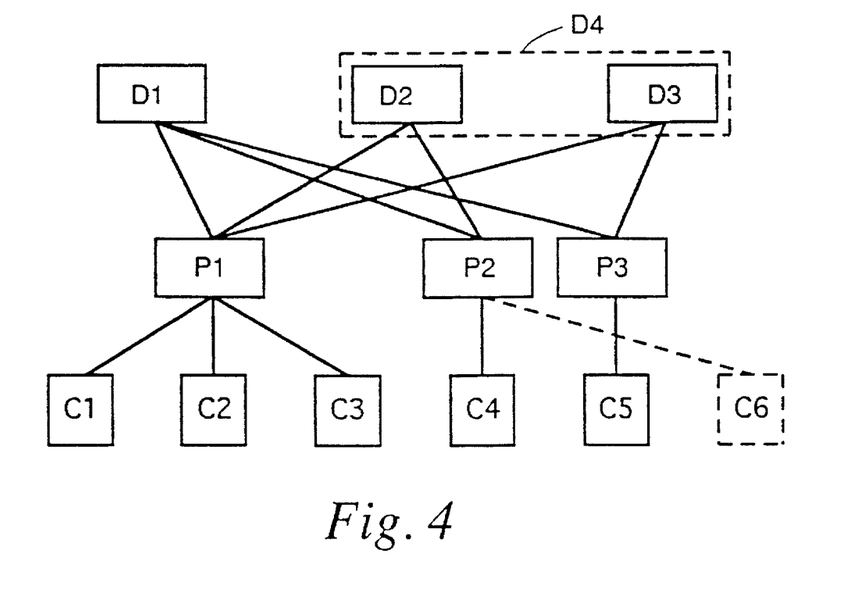
FIG. 4 shows an example of an overall configuration for broadcasting several television channels.

FIG. 4 illustrates the overall configuration of an organisation for the production and broadcasting of several pay-TV channels. This configuration is given by way of example for the sole purpose of showing the flexibility of a system according to the invention to adapt and evolve. As shown in this Figure, it is supposed that there are several TV producers P1, P2, P3 in a given region. Producer P1 produces channels C1, C2 and C3. Producer P2 produces channel C4 and producer P3 produces channel C5. There are also several broadcasters, for example one broadcaster transmitting via a Hertzjan electromagnetic network (by antenna), another broadcaster transmitting via a cable network, etc . . . . In this example, there are three different broadcasters, D1, D2 and D3.

This overall configuration must be communicated to the entire set of memory cards of the system according to the invention. This may for example be done by introducing instructions describing this configuration in the video signals of all of the broadcast channels, for example during the vertical return (of the video signal). Such simultaneous transmission of instructions for all broadcast channels may be periodically repeated, for example during each vertical return of the video signal, or each second. As a result, at any instant, when a memory card is connected to a subscriber's decoder which is operating so as to receive one of the broadcast channels, these instructions defining the overall configuration are automatically stored in the memory card. These configuration-defining instructions are as follows:

P1=C1+C2+C3

P2=C4

P3=C5

D1=P1+P2+P3

D2=P1+P2

D3=P1+P3

These symbolically-represented instructions mean: producer P1 can produce channels C1, C2 and C3; producer P2 can produce channel C4; producer P3 can produce channel C5; broadcaster D1 broadcasts the emissions of producers P1, P2 and P3; broadcaster D2 broadcasts the emissions of producers P1 and P2; and broadcaster D3 broadcasts the emissions of producers P1 and P2.

If this overall configuration is modified, which is quite likely to happen in the course of time, all of the instructions contained in all of the memory cards become obsolete. However, as will be seen, in a system according to the present invention, updating of the configuration instructions stored in all of the memory cards is relatively easy.

For example, suppose the overall configuration is modified (as indicated in FIG. 3 in dashed lines) in that producer P2 produces an additional channel C6, and broadcasters D2 and D3 merge into a single new broadcaster D4 that takes over all of the networks previously operated by the broadcasters D2 and D3. As can be seen, this modification of the overall configuration can be easily incorporated into the memory cards. For this, it suffices to add two new instructions:

P2=C6

D4=D2+D3

All of the former instructions remain valid. The new instructions add logical links setting out the modifications in the configuration.

This modification of the overall configuration can be expressed in logical terms according to Boolean algebra, and this logical or Boolean description corresponds to new links which are added to the already-existing links. It can be seen that this new concept greatly facilitates the overall system administration as well as the communication of those data that must be sent to the memory cards of the system.

Suppose, after having supplied the public with a first series of cards that can operate with the just-described overall configuration, it is planned to supply another series of memory cards which all incorporate a specific extension as regards the extent of each subscriber's reception rights under this overall configuration. For example, if the new series of memory cards add the characteristic that the cards are enabled to unscramble the channel of producer P3 via broadcaster D3 (which is not possible with the first series of cards), it suffices to initially store in all cards of the second series the following instruction:

D2=P3

A great number of further ways can likewise be devised for infinitely modifying the commercial possibilities of the system according to the invention.

Figure 5:
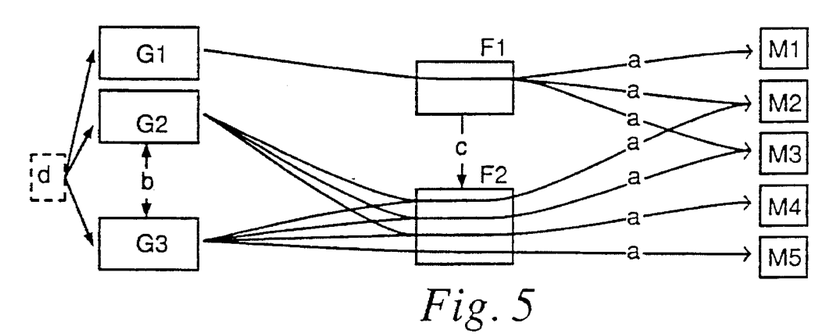
FIG. 5 shows another example of an overall configuration for broadcasting several television channels.
Figure 6:
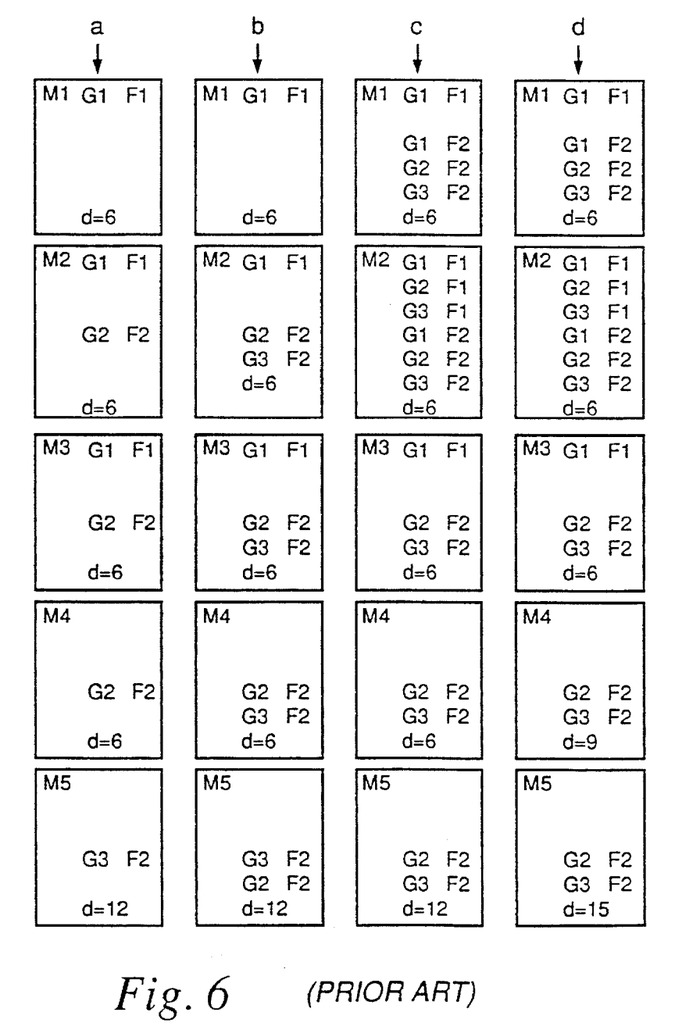
FIG. 6 shows an example how data corresponding to the configuration of FIG. 5 is stored and used in a conventional system.
Figure 7:
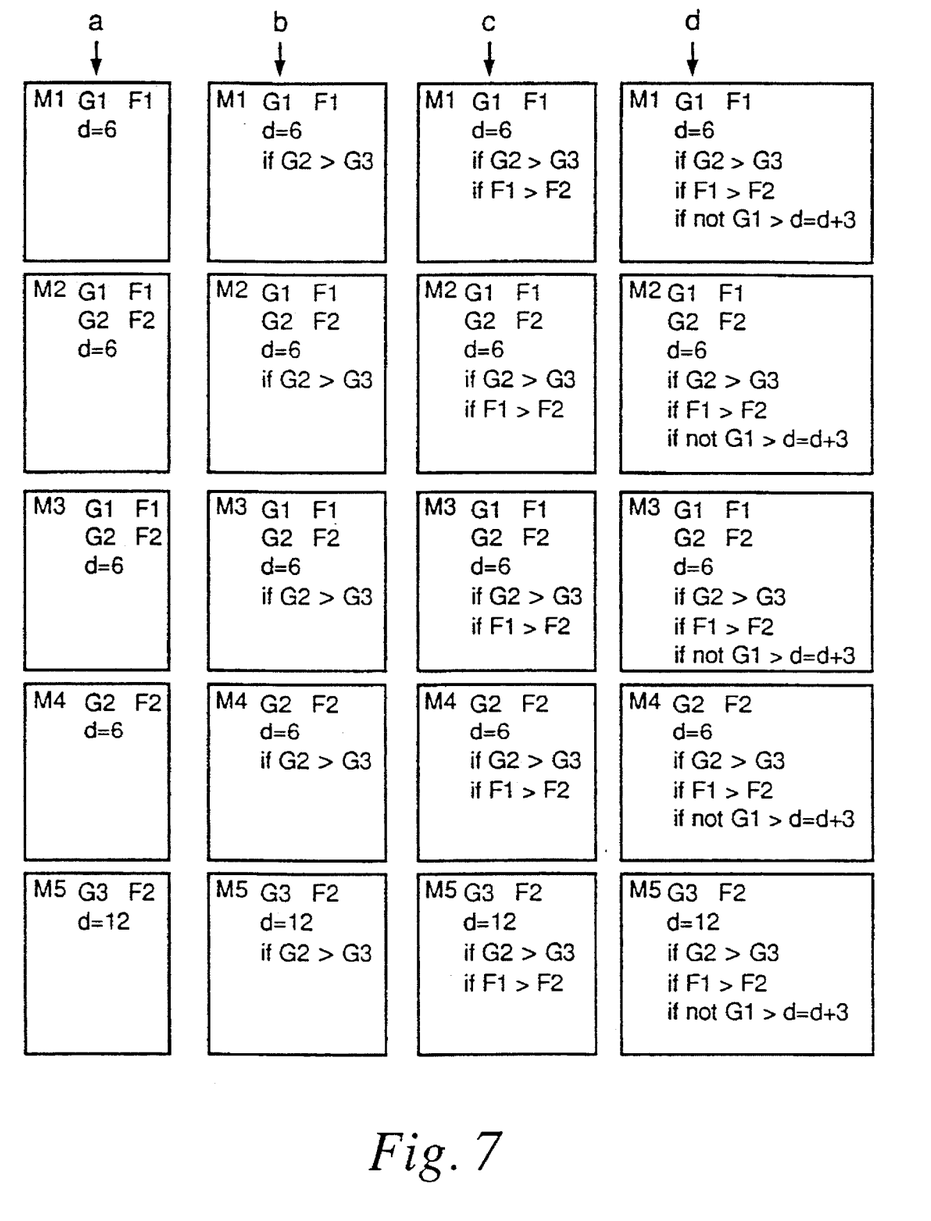
FIG. 7 shows an example how data corresponding to the configuration of FIG. 5 is stored and used, but in a system according to the present invention.

FIGS. 5 to 7 illustrate an imaginary overall configuration of another set-up for broadcasting several pay-TV programmes, given solely by way of example in order to show how the storage of data and the carrying out of specific programmes in memory cards is performed when a conventional processing system is used (FIG. 6) and when a processing system according to the invention is used (FIG. 7). FIG. 5 symbolically represents how an organisation for broadcasting pay-TV programmes has evolved over time. Arrows "a" represent the organisation as it was during an initial period, double-headed arrow "b" represents the organisation during a subsequent period, arrow "c" represents the organisation during a following subsequent period, and rectangle "d" represents an addition to the organisation during a still later period.

The initial organisation (arrows "a") comprises a first broadcaster F1 broadcasting a single television programme G1. Three memory cards M1, M2 and M3 have subscribed for 6 months to this programme G1 via broadcaster F1. The initial organisation also includes another broadcaster F2 broadcasting two more programmes G2 and G3. Cards M2, M3 and M4 have subscribed to G2 via F2 (for a 6 month subscription) and card M5 has subscribed to G3 via F2 (for a 12 month subscription).

The organisation has then evolved (arrows "b") by the convention that "any subscriber to G2 may additionally receive G3, and vice-versa".

The organisation has then further evolved (arrow "c") by the convention that "any subscriber of F1 may additionally receive the programmes of F2, but any subscriber of F2 continues to receive only the programmes of F2".

The organisation has then still further evolved (square "d") by the convention that "subscribers who are not subscribers of G1 are offered a 3-month free extension to their period of subscription".

FIG. 6 (prior art system) illustrates the contents of cards M1 to M5, the first column of this Figure showing the contents during the initial organisation period. In each card, the authorized programme or programmes is/are entered, as well as the authorized broadcasters and the duration d of the subscription. Also shown are the contents of cards M1 to M5 (second column of the Figure) taking into account the evolution of the organisation (arrow "b"), and so on. It can be seen that each time the organisation evolves, each card must be individually treated by 1°) analysing the card in order to ascertain which rights it already contains and 2°) entering any newly-acquired rights as a function of the already-stored rights. To carry out this operation in practice requires consulting a pre-recorded image of each card in a card administration centre. When there are millions of cards, this work is enormous and cannot be carried out at each and every moment, but only very occasionally. However, it would be of great commercial interest to be able to broadcast, at any moment, an announcement about any immediate change in the organisation, at the same time registering this change. This is impossible with conventional cards.

As shown in FIG. 7 (system according to this invention), it can be seen that upon each successive change of the organisation, it suffices to add new logic rules (i.e. add new logical links) at the end of the old rules. It is thus no longer necessary to read the existing rights already inscribed in each card in order to ascertain which new rights this card is entitled to. The new rules (i.e. the new logical links) are simultaneously sent to all of the cards and each card then determines which specific rights it is entitled to.

Comparing the prior art system of FIG. 6 and the system of this invention shown in FIG. 7, it can for example be seen that with this invention, the instructions resulting from events b, c, and d involve memorizing instructions formed of logical links which are identical for all of the cards for each change, whereas with the conventional arrangement, for each change, different instructions have to be sent to different cards. It is therefore self evident that the system according to the invention considerably simplifies the card administration operation.

The original insight on which the invention is based thus originates from limitations in the possibilities of using memory cards in pay-TV applications, necessitating introduction of the concept of a database within a memory card for the following reasons:

A. "Bunch" concept

Statistically, 95% of card contents evolve in an implicit way (simple renewal of acquired rights) and 5% by individual treatment. In conventional systems, both operations, renewal and individual treatment, are carried out in a similar manner by transmitting the new card content to the memory, or to a particular zone thereof. This is the only practical method with the conventional system: it would be dangerous to supply 100% unlimited rights to all cards, then destroy rights for 5% of the cards and substitute new rights therefor, because it is impossible to guarantee that destruction data are safely received.

The now-proposed solution enables for example the entire set of data to be linked to a validity date which is the only one that will be renewed, which enables the data's validity date to be extended by supplying a single instruction instead of dealing with its components. For the remaining 5% to be treated individually, it will be necessary to reconstruct new links.

B. Multiple autorisations

According to the conventional pay-TV approach, the service operator administers the group of subscribers as a single homogeneous entity. Any new subscription or any modification of a subscription could only be dealt with directly by the operator. According to this concept, there must be as many operator-dedicated zones on the card as there are operators providing a service. With this arrangement, only the "original" operator can cut off a defaulting client's subscription. By way of example, consider a subscriber X to channel A via a cable network R; if the subscriber X fails to pay his cable fee to the cable network, network R has to ask channel A to suspend the subscription rights. This leads to a considerable amount of administrative work due to the large volume of information exchanged in particular between network R and channel A, as well as that between channel A and subscriber X. This moreover implies that the payment periods between channel A and network R must be compatible, and that network R must communicate a list of defaulting payers.

However, with the conventional arrangement, channel A may fully delegate management of its subscriptions for network R to this network R. This involves the drawback that channel A must place full confidence in network R's commercial operations. Failing such an arrangement, network R would nevertheless be able to employ a technician to seal off access to the subscriber's system.

For such a case, the proposed system provides an elegant solution by linking channel A's availability to subscriber X with a data signifying network R's agreement. By this principle, network R may authorize or refuse access to A, without having to ask channel A to take any action. Moreover, authorizations of different durations may be given.

To carry out this solution requires channel A to create a subscription of defined duration which is conditional upon an approval to be granted by network R.

The creation of such links may vary from one client to another, enabling modulation of the way in which clients are authorized as a function of the signal distribution. In this manner, a client Y may subscribe using a signal originating from channel A, whereas client X subscribes via network R.

C. Contract duration and payment

According to the conventional definition, the contractual period of a subscription corresponds to the payment period, so for a one year subscription, payment should be annual.

To facilitate introducing new subscriptions, some vendors have allowed for periodical payments.

For pay-TV this creates a problem when the contract duration is one year whereas payment is monthly. So, if a one year right is granted and the client does not pay after a given month, the right has to be cancelled from the memory card. But it is impossible to know with certitude if the card has well received the cancellation message, so this message has to be repeated frequently during the entire duration of the contract. The answer to this problem consisted of granting rights for shorter periods (2 months) which are regularly extended. However, this expedient has the drawback that it does not truly reflect the contractual situation, which would be apparent when the rights are consulted.

In contrast, the proposed system enables an annual contract to be considered in such a way that it is valid upon the condition that timely payments are made. A contract can be valid for one year with a monthly authorization of use corresponding to monthly payments. Moreover, this solution corresponds precisely to the contractual definition.

D. Multiple distributions

Under the conventional conception of pay-TV systems, each operator has direct access to a restricted-access zone for each subscriber. This forces the operator to directly administer each subscriber.

The proposed system allows an operator to delegate the administration operation for a sub-set of subscribers. This means that a channel A may delegate the administration of one group of subscribers' cards to a network R1 (provided the coordinates of the subscribers' memory card are available), and to delegate the administration of another group to a network R2.

In this example, networks R1 and R2 will independently administer the subscribers to channel A. Moreover, they will have the option of independently including channel A in a "channel package" for R1 and R2. By delegating in this way, channel A may offer a series (or package) of N subscriptions that will be administered by a sub-contactor, including accounting.

The system also allows a channel A to administer all of its subscribers whereas the programme coding function is delegated to one or more other operators.

E. Self-contained Structure

Under the conventional arrangement, the operator holds all secrets/confidential information corresponding to each memory card. The sending of messages between the emitting station and a memory card takes place with an indication of the encrypted keys that must be used, typically the number of a specific key or a password. This arrangement is widespread in point-to-point communication systems, but becomes difficult to implement with more complex architectures.

The proposed system relies on the notion of keys attached to a type of data over a period of time, namely data relating to a particular link will be communicated during a given time period by using a given key. It is also possible to have several simultaneously-valid keys.

With this concept it is not necessary to send the reference of the key used during a transaction, thereby simplifying administration. The encrypting system may be decentralised and, to transmit data, needs only to know the encrypting key without having to indicate the references.

F. Banking Function

Conventional systems provide for each operator to administer its own credit management. Credit is supplied by each operator and can be used exclusively for debits relative to this operator, by the client.

The proposed system enables creation of the notion of a "bank operator" able to administer credit common to a certain number of operators, which credit may be connected to certain links.

The banking function will make a charge for the establishment of a link; in exchange, use (of the link) will be authorized (by the banking function).

COMPARATIVE EXAMPLES RELATING TO PAY-TV MULTI-CHANNEL CONTRACTS

Conventional system

Traditionally, a multi-channel contract is administered by updating independent rights for each channel. If X is a subscriber to channels A, B and C, his decoder's memory card will independently receive rights of access to channels A, B and C for a limited duration, corresponding in principle to the payment period. Upon receipt of each payment, the operator will send new rights corresponding to the period paid for. With this method, the subscriber's card will receive a number of messages equal to the number of subscriptions, plus messages relative to the encrypting keys to be used.

In case of non-payment, the rights will not be renewed beyond the upcoming time limit and/or cancellation orders will be sent.

In case of non-renewal of the contract, the rights will not be renewed.

In case of addition of a new channel to the contract, the corresponding rights have to be administered at each time limit, i.e. one extra command.

System according to the invention

The operator responsible for broadcasting the three channels will create a standard basic contract, linked to the operator (to define paternity), to a description of the three selected channels, to the contract duration and to a payment variable for administration by an operator responsible for receiving subscription payments.

When each payment is made, the accounts-receivable operator will extend the validity of the link for the thus-covered period.

Upon each contract renewal, the operator responsible for broadcasting will simply renew the validity of the "contract duration" link.

In the event of non-payment, the accounts-receivable operator will not renew the payment link and/or will destroy it.

In the event of non-renewal of the contract, the operator responsible for broadcasting will not renew the duration of the contract.

In the event of adding a new channel to the contract, it will suffice to add the new channel with a link to the previous contract, and everything will be implicit during subsequent operations.

The main difference between the two concepts comes from the difference between the conventional administration system where the operator must create an image of the memory card which has to be integrally transferred, and the concept according to the invention which enables only modifications to be sent. Moreover, whereas in the conventional system the operator's administration centre simultaneously controls the contract and payments, in the second case these two functions can be handled by two different centres.

COMPARATIVE EXAMPLES RELATING TO BANKING CARDS—THE CONCEPT OF CREDIT

Conventional system

A conventional banking-system memory card is considered as being "mono-operator", meaning that the card's identity is linked to a single organisation. The definition of password or encrypting algorithm is directly attached to this operator, which signifies that the operator can oversee the card bearer's password.

Using such cards becomes complicated when use of the card is to be authorized on systems which are independent of the operator. In such a case, either the operator must reveal its secrets to other operators, or establish a real-time connection with them.

Alternatively, it is possible to create a reserved zone for each operator, but with such a structure it is not practical to block an account if a credit limit is exceeded.

In all cases, the system will be unwieldy and have many constraints.

System according to the invention

In the case where cardholder X has an account at bank A and wishes to be able to withdraw money from banks B and C, and also to have a credit card type relationship with pool P, the card-emitter will generate the following operating zones on the memory card:

X: Cardholder's zone

A: Zone for bank managing the account

B: Zone for bank B

C: Zone for bank C

P: Zone for pool P

Zone X will contain a conditional link that will be set up upon presentation of the holder's password. The link will only be considered as valid if the correct password has been entered.

Zone A will contain the state of the account and: a link to zone X to request the password, a conditional link to zones B, C and P, a link for the function of debiting account A, and a connection with encrypting functions between (A and B), (A and C) and (A and P). Setting up of these links will take place against an exchange of cryptograms validated by the encrypting functions.

Zones B, C and P will contain a conditional link with zone A, a link with encrypting functions towards A, a link via the encrypting function with the outside world, and a link defining a debit request. Setting up of these links will take place against an exchange of cryptograms validated by the encrypting functions.

A typical exchange will take place as follows:

1. The holder inserts his card in operator P's reader.

2. The operator identifies zone P by an exchange of cryptograms and requests a link with the debit function of credit D.

3. Zone P establishes a link with the external operator, but specifies that for the link to be valid it must be completed by a link to zone A.

4. Zone A receives P's request for a link, but specifies that this link requires a link to zone X and a "debit from credit" link.

5. Zone X receives A's request for a link, but requires presentation of the password. Zone X will ask the card-reader to insert the password.

6. If the correct password is entered, zone X will grant the link with zone A.

7. Zone A may then set up a conditional link with zone P, under reserve of requesting a debit.

8. Zone P may then close the link with the external operator.

9. The debit request may then be carried out in exchange for a debit of credit from zone A.

10. The debit function will supply a cryptogram authorizing access to zone P.

11. Zone P will supply a cryptogram authorizing access towards the external operator.

12. The external operator will supply a receipt cryptogram towards zone P.

13. Zone P will supply a receipt cryptogram to zone A.

14. Zone A will supply a receipt cryptogram to zone X.

All operations between the zones take place in encrypted manner in order to guarantee authenticity of the intervening parties.

This concept enables exchange of data within the memory card according to a predefined logical set-up between contacting parties.

It will be possible for the operator of any zone to operate without knowing the secrets of another operator, because all exchanges of information take place as a function of predefined links protected by encrypted exchanges.

COMPARATIVE EXAMPLES RELATING TO CONDITIONAL DECRYPTING

Controlled-access systems require decrypting of information in dependence upon access criteria authorizing such decrypting.

Conventional system

In conventional arrangements, a memory card delivers the result of decrypting if an operator sends an encrypted message and the conditions for access are fulfilled. The conditions for access are defined at the outset, for example access rights associated with a limiting date, a reference number and a valid decrypting key. If these conditions are fulfilled, the memory card may deliver the decrypted information. This arrangement requires that the information is memorized in specific compartments each for a given type of information. This has the inherent limitation that operation is possible only within the limits of a zone reserved for one operator, and new access conditions cannot be redefined afterwards.

System according to the invention

The solution according to the invention operates under the concept wherein the conditions are defined in the form of a programme written in an SQL type language. This signifies that the conditions for access may be modulated at will, by making use as need be of data stored by other operators.

Decrypted information can only be issued if all the necessary stipulated tests in the programme are passed. It is also possible to define several paths which may lead to issuance of the information.

Usually, the programme processing the information will be compiled and hence cannot be modified. To allow subsequent modifications it will however be possible to remote-load a new compiled programme (by a supreme organisation), and/or authorize an operator to remote-load an interpretable programme enabling this operator to define a new access scheme.

I claim:

1. A system for processing the storage of data and for carrying out specific programmes, the system comprising:

at least one data administration and processing unit, a plurality of memory cards, and at least one data communication means for communicating data between at least one processing unit and each memory card, in order to transmit a given number of instructions to be stored or to be used in a memory card when this card is connected to a processing unit, characterized in that:

each memory card comprises a writeable memory for storing at least some of said instructions, and a memory for storing at least one specific programme, and each memory card connected at any instant to at least one processing unit via a communication means constitutes a relational database, all of the cards which are simultaneously connected also forming a relational database.

2. A system according to claim 1, characterized in that:

each of said memory cards comprises a means for controlling the writeable memory which, when the memory card is connected to at least one processing unit, performs the following operations:
- control of the writeable memory so as to store each input instruction coming from the processing unit in any locations whatsoever in the memory,
- a preliminary search upon inputting of a said instruction to determine whether or not this input instruction is already stored in the writeable memory, and storage of this input instruction in any location whatsoever of the writeable memory only if this input instruction is not already stored in the writeable memory, each said instruction is made up of:
- either at least one digital data,
- or a logical linking data which enables a logical link to be established between at least two other instructions or at least between the present instruction and at least one other instruction,
- or a combination of such a logical linking data with at least one digital data, and the memory card includes means for controlling the performance of at least one specific programme stored in the memory card, using for this purpose at least one logic set constituted by all of the instructions connected together by logical links, selected from amongst said instructions stored in the writeable memory of the memory card.

3. A system according to claim 2, characterized in that each said instruction or part of an instruction related to a said logical link is an instruction or a part of an instruction which either is already stored in the memory card, or is to be stored later in the memory card.

4. A system according to claim 3, characterized in that each said instruction stored in the writeable memory of the memory card is associated with one or more identification codes which enable said thus-constituted different logic set or sets to be identified later.

5. A system according to claim 1, characterized in that said at least one data communication means allows transfer of data only in one direction, from a processing unit to any memory card connected thereto.

6. A system according to claim 5, characterized in that the system is a restricted-access type system such as a pay-TV system in which:
- each memory card is a card possessed by a subscriber to the system, which card is connectable to a decoder of the system to allow the performance of a restricted-access function,
- said processing unit is either a memory card administration service or is a station for transmitting a scrambled video signal, and
- said data communication means communicates data by Herzian electromagnetic transmission, by satellite or by cable.

7. A system according to claim 1, characterized in that:

said at least one processing unit comprises periodicity-setting means which repeatedly sends a group of said instructions with a given periodicity via said at least one data communication means, in such a manner that all of the memory cards which are connected simultaneously to at least one processing unit at any given instant receive, in a time interval determined by said periodicity, said group of instructions, whereby all of the memory cards which are simultaneously connected to a processing unit via a data communication means constitute at said instant a relational database.

8. A set of memory cards, characterized in that each memory card of the set comprises:
- a writeable memory for storing instructions, and a memory for storing at least one specific programme,
- and in that all of the memory cards of the set which are simultaneously connected at any instant to at least one processing unit via a communication means constitute at this instant a relational database.

9. A set of memory cards according to claim 8, which set is for use in a system for administering and processing the storage of data and for carrying out specific programmes, the system comprising:
- at least one data administration and processing unit, and
- at least one data communication means for communicating data between at least one processing unit and each memory card of the set, in order to transmit a given number of instructions to be stored in a memory card when this memory card is connected to a processing unit, wherein each card of the group comprises a means for controlling the writeable memory which, at the instant when the memory card is connected to at least one processing unit, performs the following operations:
- control of the writeable memory so as to store each input instruction coming from the processing unit in any locations whatsoever in the memory,
- a preliminary search upon inputting of a said instruction to determine whether or not this input instruction is already stored in the writeable memory, and storage of this input instruction in any location whatsoever of the writeable memory only if this input instruction is not already stored in the writeable memory, each said instruction is made up of:
- either at least one digital data,
- or a logical linking data which enables a logical link to be established between at least two other instructions or at least between the present instruction and at least one other instruction,
- or a combination of such a logical linking data with at least one digital data, and the memory card includes means for controlling the performance of at least one specific programme stored in the memory card, using for this at lease one logic set constituted by all of the instructions connected together by logical links, selected from amongst said instructions stored in the writeable memory of the memory card.

10. A method of administering and processing the storage of data and carrying out specific programs, the method comprising the following steps:
- providing at least one data administration and processing unit,
- providing a plurality of memory cards, and
- providing at least one data communication means for communicating data between at least one processing unit and each memory card, and transmitting a given number of instructions via a data communication means whereby these instructions are stored in a memory card when this memory card is connected to a processing unit, the method being further characterized by the following steps:

storing at least some of said instructions in a writeable memory of each memory card, storing at least one specific programme in a memory of each memory card, and constituting the thus-stored instructions in the form of instructions including logic links so that each memory card connected to at least one processing unit via a communication means constitutes a relational database.

11. The method of claim 10, characterized in that it further comprises the following steps:

providing in each of said memory cards a means for controlling the writeable memory so that, when the memory card is connected to at least one processing unit, it performs the following operations:

control of the writeable memory so as to store each input instruction coming from the processing unit in any locations whatsoever in the memory, a preliminary search upon inputting of a said instruction to determine whether or not this input instruction is already stored in the writeable memory, and storage of this input instruction in any location whatsoever of the writeable memory only if this input instruction is not already stored in the writeable memory, providing each said instruction so it is made up of:
either at least one digital data,
or a logical linking data which enables a logical link to be established between at least two other instructions or at least between the present instruction and at least one other instruction,
or a combination of such a logical linking data with at least one digital data, and controlling, in the memory card, the performance of at least one specific programme stored in the memory card, using for this purpose at least one logic set constituted by all of the instructions connected together by logical links, selected from amongst said instructions stored in the writeable memory of the memory card.

12. The method of claim 10, characterized in that said data is transmitted between at least one processing unit and the memory cards with a one-way flux, from at least one processing unit to the memory cards.

13. The method of claim 10, characterized in that:

there are at least two different processing units, said data is transmitted between the processing units and the memory cards with a two-way flux, and some data is, during a first connection of a memory card with a first processing unit, transmitted from the first processing unit to the memory card and then, during another simultaneous or later connection of a memory card with another processing unit, transmitted from said memory card to this processing unit.

14. A memory card of the type including pay-TV cards, banking cards and other cards for restricted-access and like systems, comprising a writeable memory storing a set of data and at least one programme for performing specific operations on the stored data, characterized in that the stored set of data is constituted by storing, at any locations whatsoever selectable by the memory, successive data received by connecting the card, via a data communication means, to one or more data administration and processing units of one or more restricted-access systems or the like, the set of data comprising logical links connecting stored data or enabling the setting up of links between the stored data, whatever may be the data storage location or its order of inputting, and possibly also linking with other data, thus constituting within the card a relational database, said programme being arranged to go through and inspect the entire set of data of the relational database constituted within the card so as to carry out at least one specific operation with data interconnected by at least one logical link.

15. A memory card according to claim 14, characterized in that the relational database is constituted, on the one hand, of data pre-stored in the memory and, on the other hand, of data received from one or more data administration and processing units, the logic links of the relational database being contained either in pre-stored data, or in received data, or both, so that the or each programme can only perform a specific operation when the relational database has been constituted within the card by said connection.

* * * * *

UNITED STATES PATENT AND TRADEMARK OFFICE
CERTIFICATE OF CORRECTION

PATENT NO. : 5,497,418
DATED : March 5, 1996
INVENTOR(S) : Andre Kudelski

It is certified that error appears in the above-indentified patent and that said Letters Patent is hereby corrected as shown below:

In column 1, line 25, please delete the hyphen after "systems"--.

In column 3, line 35, please delete the comma.

In column 8, line 33, please delete "missions" and insert in lieu thereof --emissions--.

In column 11, line 25, please delete "Hertzjan" and insert in lieu thereof --Hertzian--.

In column 20, line 53, please delete "lease" and insert in lieu thereof --least--.

Signed and Sealed this

Twenty-third Day of July, 1996

Attest:

BRUCE LEHMAN

Attesting Officer      Commissioner of Patents and Trademarks